United States Patent [19]
Nagasawa

[11] Patent Number: 6,010,120
[45] Date of Patent: Jan. 4, 2000

[54] FLUID-FILLED VIBRATION DAMPING DEVICE HAVING PNEUMATICALLY OSCILLATED MEMBERS PARTIALLY DEFINING PRIMARY AND AUXILIARY FLUID CHAMBERS

[75] Inventor: Masahiko Nagasawa, Kani, Japan

[73] Assignee: Tokai Rubber Industries, Ltd., Japan

[21] Appl. No.: 08/993,785

[22] Filed: Dec. 18, 1997

[30] Foreign Application Priority Data

Dec. 25, 1996 [JP] Japan .................................. 8-345270

[51] Int. Cl.[7] .................................. B60K 5/12; F16F 9/10
[52] U.S. Cl. .................................. 267/140.14; 267/140.12; 267/140.13; 267/219; 267/35
[58] Field of Search .................... 267/140.11, 140.12, 267/140.13, 140.14, 35, 219, 220, 64.14, 64.28; 248/635, 562, 638, 566, 550; 180/300, 312, 902

[56] References Cited

U.S. PATENT DOCUMENTS

| | | | |
|---|---|---|---|
| 4,720,084 | 1/1988 | Hollerweger et al. | 267/140.14 |
| 4,828,234 | 5/1989 | Hoying et al. | 267/140.1 |
| 5,098,072 | 3/1992 | Muramatsu et al. | 267/140.12 |
| 5,114,124 | 5/1992 | Muramatsu | 267/140.1 |
| 5,145,156 | 9/1992 | Muramatsu et al. | 267/140.14 |
| 5,170,998 | 12/1992 | Muramatsu | 267/140.13 |
| 5,180,148 | 1/1993 | Muramatsu | 267/140.14 |
| 5,246,212 | 9/1993 | Funahashi et al. | 267/140.13 |
| 5,393,041 | 2/1995 | Takano et al. | 267/140.14 |

FOREIGN PATENT DOCUMENTS

| | | |
|---|---|---|
| 0 115 417 A2 | 8/1984 | European Pat. Off. . |
| 0 164 081 A2 | 12/1985 | European Pat. Off. . |
| 2 652 626-A1 | 8/1991 | France . |
| 34 47 746 A1 | 7/1986 | Germany . |
| 61-191543 | 11/1986 | Japan . |
| 5164183 | 6/1993 | Japan ................................. 267/140.12 |
| 5172181 | 7/1993 | Japan ................................. 267/140.12 |

OTHER PUBLICATIONS

Patent Abstracts of Japan; vol. 017, No. 572 (M–1497), Oct. 18, 1993 & JP 05 164183 A (Bridgestone Corp.), Jun. 29, 1993, *abstract*.
Patent Abstracts of Japan; vol. 016, No. 191 (M–1245), May 8, 1992 & JP 04 025635 A (Bridgestone Corp.), Jan. 29, 1992, *abstract*.
Patent Abstracts of Japan; vol. 011, No. 140 (M–586), May 8,1987 & JP 61 278639 A (Nissan Motor Co. Ltd), Dec. 9, 1986, *abstract*.

*Primary Examiner*—Douglas C. Butler
*Attorney, Agent, or Firm*—Parkhurst & Wendel, L.L.P.

[57] ABSTRACT

A fluid-filled vibration damping device wherein two mutually spaced-apart mounting member are elastically connected by an elastic body, which cooperates with a first movable member to define a primary fluid chamber communicating through an orifice with an auxiliary fluid chamber partially defined by a second movable member, and the first and second movable members partially define respective mutually independent first and second working air chambers on their sides remote from the primary and auxiliary fluid chambers, and are oscillated by periodic change of air pressures in the working air chambers.

15 Claims, 4 Drawing Sheets

FLUID-FILLED VIBRATION DAMPING DEVICE HAVING PNEUMATICALLY OSCILLATED MEMBERS PARTIALLY DEFINING PRIMARY AND AUXILIARY FLUID CHAMBERS

The present application is based on Japanese Patent Application No. 8-345270 filed on Dec. 25, 1996, the content of which is incorporated hereto by reference.

BACKGROUND OF THE INVENTION

1. Field of the Invention

The present invention relates to a fluid-filled damping device which has a fluid chamber or chambers filled with a non-compressible fluid and which is capable of exhibiting a high damping effect with respect to input vibrations, by positively utilizing flows of the fluid and changing the pressure of the fluid within the fluid chamber or chambers.

2. Discussion of the Related Art

As one type of a vibration damper adapted to damp input vibrations based on flows of the non-compressible fluid, there is known a fluid-filled vibration damping device as disclosed in JP-U-61-191543 (laid-open publication of Japanese Utility Model Application). Such a fluid-filled vibration damping device includes a first and a second mounting member which are spaced apart from each other; an elastic body elastically connecting the first and second mounting members and partially defining a primary fluid chamber filled with a non-compressible fluid the pressure of which changes upon application of a vibrational load between the first and second mounting members; a movable member which partially defines an auxiliary fluid chamber filled with the non-compressible fluid and which is oscillated to cause a periodic change of a pressure of the fluid in the auxiliary fluid chamber; and means for defining an orifice for fluid communication between the primary and auxiliary fluid chambers.

In this type of vibration damping device, the pressure change induced in the auxiliary fluid chamber by the oscillation of the movable member is controlled in view of the pressure change which is induced in the primary fluid chamber as a result of elastic deformation of the elastic body upon application of the vibrational load to the vibration damping device. With the pressure change in the auxiliary fluid chamber being controlled, the flows of the fluid through the orifice can be controlled, so that the vibration damping device exhibits a high vibration damping effect, based on the resonance of the fluid flowing through the orifice, or based on the fluid pressure change which is induced in the auxiliary fluid chamber and which is transmitted to the primary fluid chamber through the orifice.

The known fluid-filled vibration damping device described above must incorporate electromagnetic drive means for oscillating the movable member, as described in the above-identified publication. The electromagnetic drive means includes a relatively large number of comparatively expensive components such as a permanent magnet, a coil and a yoke member. Accordingly, the known vibration damping device tends to suffer from difficulty of manufacture at a low cost, and inevitably has other problems such as an increase in size and weight.

For assuring a sufficient degree of stability of the electromagnetic force generated by the electromagnetic drive means, the coil, permanent magnet and other components must be built in the damping device with high positional and dimensional accuracy, requiring a high level of skill for the manufacture, and reducing the efficiency of manufacture of the damping device on a large scale.

Further, the known fluid-filled vibration damping device suffers from other problems such as a temperature rise due to heat generated by energization of the coil, and a relatively large amount of electric power consumption, where the oscillation of the movable member is required to be effected continuously for a long time or with a large drive force, depending upon the specific operating condition or required operating characteristics of the damping device.

The fluid-filled vibration damping device as disclosed in the above-identified publication does not exhibit a sufficient damping effect with respect to the input vibrations whose frequencies are outside a range to which the orifice between the primary and auxiliary fluid chambers is tuned. In particular, there has been a need for improving the damping effect with respect to the vibration frequencies higher than the frequency range to which the orifice is tuned.

SUMMARY OF THE INVENTION

It is therefore a first object of this invention to provide a relatively small-sized, light-weight fluid-filled vibration damping device which is simple in construction with a relatively small number of components, and which incorporates a novel mechanism for oscillating the movable member so as to effectively control the fluid pressure within the auxiliary fluid chamber.

It is a second object of this invention to provide a fluid-filled vibration damping device capable of controlling the fluid pressure in the auxiliary fluid chamber continuously for a long time by oscillation of the movable member, with improved stability, without the conventionally experienced problems such as heat generation and requirement for large electric power consumption by the oscillating mechanism for the movable member.

It is a third object of this invention to provide a fluid-filled vibration damping device which is simple in construction and which is capable of exhibiting a high damping effect over a sufficiently wide range of frequency of the input vibrations.

The above objects may be achieved according to the principle of the present invention, which provides a fluid-filled vibration damping device comprising: (a) a first and a second mounting member which are spaced apart from each other; (b) an elastic body elastically connecting the first and second mounting members and partially defining a primary fluid chamber filled with a non-compressible fluid, the elastic body being elastically deformed so as to cause a change in a pressure of the fluid in the primary fluid chamber, upon application of a vibrational load between the first and second mounting members; (c) a first movable member partially defining the primary fluid chamber and movable relative to the first and second mounting members, the first movable member partially defining a first working air chamber on one of opposite sides thereof which is remote from the primary fluid chamber, the first movable member being oscillated by a periodic change of an air pressure in the first working air chamber; (d) a second movable member partially defining, on one of opposite sides thereof, an auxiliary fluid chamber filled with the non-compressible fluid, and on the other of the opposite sides, a second working air chamber independent of the first working air chamber, the second movable member being oscillated by a periodic change of an air pressure in the second working air chamber; and (e) means for defining an orifice for fluid communication between the primary and auxiliary fluid chambers.

In the fluid-filled vibration damping device of the present invention constructed as described above, the second movable member is oscillated by a periodic change of the air pressure in the second working air chamber, whereby the pressure of the fluid in the auxiliary fluid chamber is periodically changed. In other words, the periodic change of the air pressure in the second working air chamber is transferred to the auxiliary fluid chamber through the oscillation of the second movable member, so that the fluid pressure in the auxiliary fluid chamber can be controlled by controlling the air pressure in the second working air chamber, so as to permit the vibration damping device to exhibit a high vibration damping effect on the basis of the flows of the fluid through the orifice and the fluid pressure control in the primary fluid chamber which is effected through the orifice.

Further, the first movable member is oscillated by a periodic change of the air pressure in the first working air chamber, whereby the pressure of the fluid in the primary fluid chamber is periodically changed. Thus, the fluid pressure in the primary fluid chamber can be directly controlled by controlling the air pressure in the first working air chamber. Accordingly, the thus controlled fluid pressure in the primary fluid chamber gives the vibration damping device the desired vibration damping characteristics, in cooperation with or independently of the orifice. For instance, the air pressure in the first working air chamber is controlled for oscillating the first movable member so as to absorb or reduce a rise of the fluid pressure in the primary fluid chamber for thereby lowering the dynamic spring constant of the damping device upon application of input vibrations having relatively high frequencies that cannot be effectively damped by the fluid flows through the orifice, that is, upon application of input vibrations whose frequencies are higher than a frequency range to which the orifice is tuned. Alternatively, the air pressure in the first working air chamber is controlled for oscillating the first movable member so as to maintain the fluid pressure in the primary fluid chamber at a relatively high level for enabling the damping device to exhibit a high damping effect with respect to input vibrations having relatively low frequencies. Still alternatively, the air pressure in the first working air chamber is controlled for oscillating the first movable member to regulate the fluid pressure in the primary fluid chamber so that the damping device exhibits an improved damping effect based on the fluid flows through the orifice, with respect to the low-frequency vibrations to which the orifice is tuned.

Further, the present fluid-filled vibration damping device does not incorporate or require any actuator such as electromagnetic drive means for oscillating the movable member, but is capable of controlling the fluid pressures within the auxiliary and primary fluid chambers. Accordingly, the present damping device is simple and compact in construction with a reduced number of components and a reduced weight, and is therefore comparatively easy and economical to manufacture.

It is also noted that the present fluid-filled vibration damping device permits the fluid pressures within the auxiliary and primary fluid chambers to be suitably changed by utilizing an external air pressure source. The use of the air pressure from the external pressure source permits a continuous operation of the damping device so as to exhibit a desired vibration damping effect with high stability, without conventionally experienced drawbacks such as a temperature rise of the damping device due to heat generated by the electromagnetic drive means and a relatively large amount of consumption of electric power. Where the present damping device is used for a motor vehicle having an internal combustion engine, the reduced pressure for the damping device is readily available from the engine, and a vacuum pressure source exclusively used for the damping device is not necessary for controlling the fluid pressures in the auxiliary and primary fluid chambers to assure high vibration damping stability.

According to one preferred form of the present invention, each of at least one of the first and second movable members includes a rubber member which produces an elastic force for restoring each movable member to an original position during oscillation thereof. In this case, the rubber member may be provided with a relatively rigid member fixed thereto for restricting or controlling the amount and direction of deformation or displacement of the rubber member.

In the above preferred form of the damping device, the air pressure change in the first or second working air chamber can be effectively transmitted to the corresponding primary or auxiliary fluid chamber through the elastic deformation or displacement of the rubber member. The use of the rubber member for the first or second movable member is effective to improve the response of the fluid pressure in the primary or auxiliary fluid chamber and the response of the damping device.

In addition, the movable member can be restored by the elasticity of the rubber member to its original position with high stability, facilitating the control of the fluid pressure in the primary or auxiliary fluid chamber. For instance, the rubber member is held in its original position and shape while the working air chamber is exposed to the atmospheric pressure, and is moved to another position upon exposure to a reduced pressure. In this case, the movable member can be suitably returned to its original position by the elastic force produced by the rubber member when the pressure in the working air chamber is changed from the reduced pressure to the atmospheric pressure. The use of the rubber member for the movable member permits the oscillation of the movable member by periodically changing the air pressure in the working air chamber between two different negative values or between two different positive values, or alternatively between the atmospheric pressure and a predetermined negative or positive pressure.

According to another preferred form of this invention, the fluid-filled vibration damping device further comprises biasing means for biasing each of at least one of the first and second movable members in a predetermined direction.

In the above form of the invention, the movable member in question may be oscillated by alternate application of: two different values of negative pressure; two different values of positive pressure; negative and atmospheric pressures; or positive and atmospheric pressures. In any of these cases, the biasing means may be provided to bias the movable member in a selected biasing direction, so that the movable member which has been displaced from a first position to a second position in the direction opposite to the biasing direction by application of an air pressure is returned to the first position with the aid of the biasing force of the biasing means. Thus, the biasing means assures stable oscillation of the movable member, and accurate and stable control of the fluid in the primary or auxiliary fluid chamber.

Where the movable member includes a rubber member which produces an elastic force acting on the movable member so as to be restored to its original position, the biasing means reduces the fatigue of the rubber member, permitting the rubber member to maintain its original characteristic of displacement or deformation for a long time, and making it possible to maintain the desired characteristic of control of the fluid pressure in the primary or auxiliary fluid chamber for a long time, leading to improved stability of vibration damping performance of the damping device.

In a further preferred form of the present invention, the fluid-filled vibration damping device further comprises: at least one flexible diaphragm each of which partially defines an equilibrium fluid chamber filled with the non-compressible fluid, such that each flexible diaphragm permits a change in a volume of the equilibrium fluid chamber; and means for defining a communication passage for fluid communication between the primary fluid chamber and the equilibrium fluid chamber. Two or more communication passages may be provided for fluid communication between the primary fluid chamber and the equilibrium fluid chamber partially defined by each flexible diaphragm. The primary fluid chamber may communicate with two or more mutually independent equilibrium fluid chambers through respective communication passages.

In the above form of the invention, a pressure change of the fluid in the primary fluid chamber upon application of the vibrational load to the damping device causes a difference between the fluid pressure in the primary and equilibrium fluid chambers. Based on the resonance of the fluid which is forced to flow through the communication passage or passages due to the pressure difference, the input vibration is effectively damped.

The communication passage or passages for fluid communication between the primary and equilibrium fluid chambers can be tuned to a frequency band of the vibration which is different from that of the orifice for fluid communication between the primary and auxiliary fluid chambers. Accordingly, the present damping device exhibits an intended damping effect with respect to a wide range of frequency of the input vibrations.

In one advantageous arrangement of the above preferred form of the invention, the communication passage for fluid communication between the primary and equilibrium fluid chambers and the orifice for fluid communication between the primary and auxiliary fluid chambers are tuned such that a frequency of the vibrational load which is effectively damped by flows of the fluid through the communication passage is lower than that of the vibrational load which is effectively damped by flows of the fluid through the orifice. This arrangement permits easy and effective damping of the input vibrations in different frequency bands, based on the flows of the fluid through the communication passage and the flows of the fluid through the orifice, respectively, without having to use exclusive fluid flow control means for limiting the fluid flows through the communication passage, for example.

According to a still further preferred form of the invention, the first mounting member consists of an inner sleeve, while the second mounting member consists of an outer sleeve disposed radially outwardly of the inner sleeve, and the elastic body is interposed between the inner and outer sleeves and has a pocket which is open in an outer circumferential surface thereof and closed by the outer sleeve so as to form the primary fluid chamber. In this case, the first movable member is disposed within the pocket and cooperates with the outer sleeve to define the first working air chamber.

The fluid-filled vibration damping device according to the above form of the invention, which may be referred to as a cylindrical damper, can be suitably used as an engine mount, a differential mount or a suspension bushing, for front-engine front-drive motor vehicle, for example. In the instant cylindrical damper, the space between the inner and outer sleeves can be efficiently utilized for forming the primary and auxiliary fluid chambers, resulting in compact overall construction of the damping device.

In one advantageous arrangement of the above form of the invention, the fluid-filled vibration damping device further comprises an intermediate sleeve which is fitted on an outer circumferential surface of the elastic body and which has a window formed therethrough, and the pocket formed in the elastic body is open in an outer circumferential surface of the intermediate sleeve through the window. In this case, the outer sleeve is fitted on the outer circumferential surface of the intermediate sleeve so as to close the window, and cooperates with the pocket to define the primary fluid chamber. The intermediate sleeve has a recessed portion open in the outer circumferential surface thereof. The second movable member cooperates the the outer sleeve to define the second working air chamber on one of its opposite sides, and cooperates with the recessed portion to define the auxiliary fluid chamber on the other side.

In the damping device according to the above arrangement, the space between the inner and outer sleeves can be effectively utilized to provide the auxiliary fluid chamber and the second working air chamber as well as the primary fluid chamber and the first working air chamber. Thus, the damping device is made simple and compact in construction with a relatively small number of components.

According to a yet further preferred form of this invention, the fluid-filled vibration damping device further comprises a pressure control device connected to the first and second working air chambers, for changing the air pressures in the first and second working air chambers independently of each other and in synchronization with a frequency of the vibrational load to be damped by the vibration damping device.

In the fluid-filled vibration damping device according to the above preferred form of the invention, the fluid pressures in the primary and auxiliary fluid chambers are controlled independently of each other such that there exists a suitable phase difference between the fluid pressure change within the primary fluid chamber and the fluid pressure change within the auxiliary fluid chamber. In other words, by suitably adjusting the phase difference between the fluid pressure changes in the primary and auxiliary fluid chambers, the damping device exhibits the desired vibration damping characteristics based on the resonance of the fluid flows through the orifice and the fluid pressure control within the primary fluid chamber.

To change the air pressure in the first and second working air chambers in synchronization with the frequency of the input vibration, the pressure control device may preferably include an air pressure source such as a vacuum pressure source, and two switch valves for connecting the respective first and second working air chambers selectively to the air pressure source and an atmosphere. For facilitating the control of the switch valves at a relatively high frequency, the switch valves are desirably solenoid-operated switch valves, which may be controlled in a known adaptive control fashion or according to stored data maps, on the basis of an output signal of a vibration sensor such as an acceleration sensor.

BRIEF DESCRIPTION OF THE DRAWINGS

The above and optional objects, features, advantages and technical and industrial significance of this invention will be better understood by reading the following detailed description of presently preferred embodiments or modes of the invention, when considered in connection with the accompanying drawings, in which:

FIG. 3 is cross sectional view taken along line 3—3 of FIG. 2; an

DETAILED DESCRIPTION OF THE PREFERRED EMBODIMENTS

Figure 1:
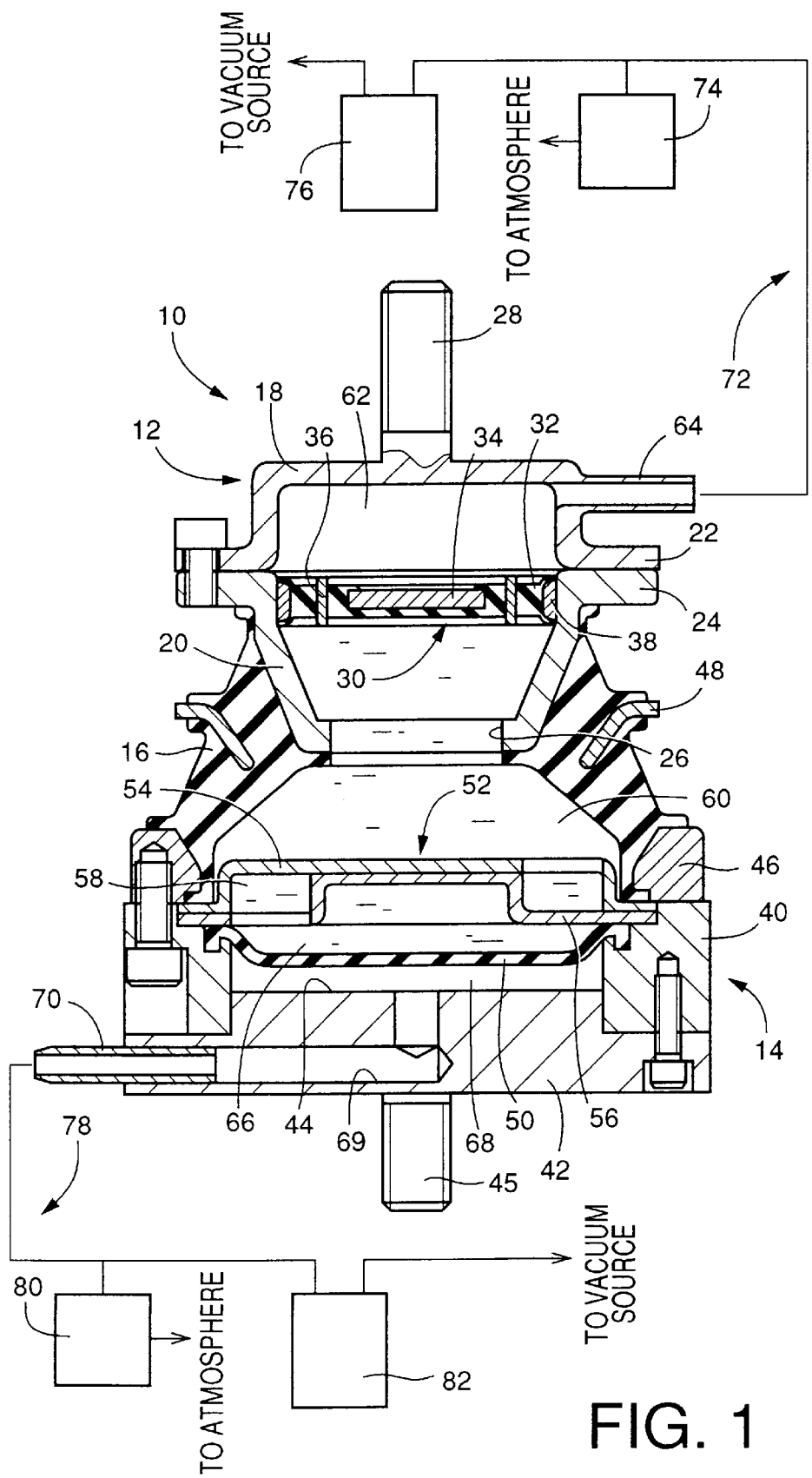
FIG. 1 is an elevational view in axial or vertical cross section of a fluid-filled vibration damping device in the form of an mount constructed according to a first embodiment of th invention.

Referring first to FIG. 1, there is shown a fluid-filled vibration damping device in the form of an engine mount 10 constructed according to one embodiment of this invention. This engine mount 10 includes a first mounting member 12 and a second mounting member 14 which are both made of metallic materials and which are disposed in mutually opposed and spaced-apart relationship with each other. These first and second mounting members 12, 14 are elastically connected to each other by an elastic body 16 made of a rubber material, and are attached to one and the other of the power unit and the body of the motor vehicle, so that the power unit which includes an engine is mounted on the vehicle body in a vibration damping fashion. With this engine mount 10 installed on the vehicle as described above, the elastic body 16 is held elastically compressed with the weight of the power unit acting on the engine mount 10. The engine mount 10 is installed so as to damp input vibrations which are applied in the direction in which the two mounting members 12, 14 are opposed to each other, namely, in the vertical direction as seen in FIG. 1 and in a direction almost parallel to the vertical direction.

The first mounting member 12 includes an upper metal member 18 and a lower metal member 20, which are both cup-shaped members having respective outward flanges 22, 24 at their openings. The upper and lower metal members 18, 20 are fluid-tightly superposed on each other at their outward flanges 22, 24, so as to constitute a hollow structure. The lower metal member 20 has an opening 26 formed through its bottom wall having a relatively small diameter, so that the hollow structure of the first mounting member 12 is open downwardly. The upper metal member 18 has a mounting screw 28 secured to its bottom wall so as to extend in the upward direction. The engine mount 10 is fixed with the mounting screw 28 to one of the power unit and body of the vehicle.

A first movable member 30 is accommodated within the hollow structure of the first mounting member 12. The first movable member 30 consists of a rubber member 32, a metal disk 34, an inner metal ring 36 and an outer metal ring 38. The rubber member 32 is a circular disk having a suitable thickness. The metal disk 34 is bonded to a central portion of the rubber member 32 in the process of vulcanization of a rubber material to form the rubber member 32. The inner metal ring 36 is embedded in the rubber member 32 such that the inner metal ring 36 is located radially outwardly of the central metal disk 34. The metal disk 34 and the inner metal ring 36 prevent undesirable deformation of the rubber member 32 and establish a suitable degree of rigidity of the first movable member 30. The outer metal ring 38 is bonded by vulcanization to the circumferential surface of the rubber member 32, and is press-fitted in the open end portion of the lower metal member 20, which end portion has a larger diameter of the bottom wall having the opening 26. Thus, the first movable member 30 is secured to the lower metal member 20 such that the first movable member 30 fluid-tightly closes the large-diameter opening of the lower metal member 20, so that the first movable member fluid-tightly divides the space within the hollow structure of the first mounting member 12 into an upper and a lower section.

The second mounting member 14 includes a cylindrical member 40 and a circular disk-shaped bottom member 42, which are both made of metallic materials. These members 40, 42 are superposed on each other in the axial or vertical direction and bolted together, so as to constitute a generally disk-like structure having a relatively large thickness or axial dimension. This generally disk-like structure has a recess 44 formed in a central area of its upper surface, such that the recess 44 is open upwardly. The bottom member 42 has a mounting screw 45 secured to its bottom wall so as to extend in the downward direction, so that the engine mount 10 is fixed with the mounting screw 45 to the other of the vehicle power unit and body.

The second mounting member 14 is disposed below the first mounting member 12 such that the second mounting member 14 is opposed to and spaced apart from the first mounting member 12 in the axial direction, with a predetermined axial or vertical spacing distance. The elastic body 16 is interposed between the two mounting members 12, 14 for elastic connection therebetween.

The elastic body 16 has a hollow frusto-conical shape having a relatively large wall thickness. The lower metal member 20 of the first mounting member 12 and a connecting ring 46 are bonded to the small-diameter and large-diameter open ends of the elastic body 16, respectively, in the process of vulcanization of a rubber material to form the elastic body 16. The connecting ring 46 is superposed on the upper surface of the cylindrical member 40 of the second mounting member 14, and bolted to the cylindrical member 14, whereby the elastic body 16 is secured at its large-diameter end to the second mounting member 14. The elastic body 16 has a restricting ring 48 almost entirely embedded in an axially intermediate portion thereof. This restricting ring 48 is provided to prevent buckling of the elastic body 16, thereby stabilizing the elastic deformation of the elastic body 16.

In the recess 44 formed in the second mounting member 14, there are disposed a second movable member in the form of a flexible diaphragm 50 and a partition member 52 such that the flexible diaphragm 50 and the partition member 52 are superposed on each other at their peripheral portions, which are held by and between the cylindrical member 40 and the connecting ring 46, whereby the flexible diaphragm 50 and the partition member 52 are fixed to the second mounting member 14.

The flexible diaphragm 50 is a thin circular layer which fluid-tightly closes the opening of the recess 44 formed in the second mounting member 14. The partition member 52 consists of an upper partition plate 54 and a lower partition plate 56 both having a circular shape. These upper and lower partition plates 54, 56 are partially superposed on each other in their axial direction. The partition member 52 is located above the flexible diaphragm 50, and fluid-tightly divides a space between the elastic body 16 and the second mounting member 14, into an upper part and a lower part. The two partition plates 54, 46 cooperate to define an orifice 58 extending in their circumferential direction over a suitable length.

The partition member 52 cooperates with the elastic body 16 to define the above-indicated upper part of the space, which functions as part of a primary fluid chamber 60 filled with a non-compressible fluid such as water, alkylene glycol, polyaklylene glycol or silicone oil. Upon application of a vibrational load between the first and second mounting members 12, 14, the elastic body 16 is elastically deformed in an oscillating manner, thereby causing a periodic change of a pressure of the fluid within the primary fluid chamber 60. The non-compressible fluid filling the primary fluid chamber 60 is preferably a low-viscosity fluid whose viscosity is 0.1 Pa.s or lower, so that the present engine mount 10 exhibits an excellent vibration damping effect on the basis of the resonance of the fluid.

The primary fluid chamber 60, which are partially defined by the elastic body 16 and the partition member 52 as described above, includes the space within the lower metal member 20 of the first mounting member 12. That is, the primary fluid chamber 60 is also partially defined by the lower metal member 20 having the opening 26, and the first movable member 30 movably fixed within the hollow structure of the first mounting member 12. The first movable member 30 cooperates with the upper metal member 18 to define a first working air chamber 62, which is located on one of the opposite sides of the first movable member 30 which is remote from the primary fluid chamber 60. The upper metal member 18 is formed with a first nipple 64 which has an air passage communicating with the first working air chamber 62.

On the other hand, the second movable member in the form of the flexible diaphragm 50 cooperates with the partition member 52 to define the above-indicated lower part of the space, which functions as an auxiliary fluid chamber 66 which is filled with the same non-compressible fluid as the fluid filling the primary fluid chamber 60. This auxiliary fluid chamber 66 communicates with the primary fluid chamber 60 through the orifice 58 formed within the partition member 52. Periodic fluid pressure change in the primary fluid chamber 60 caused by oscillatory elastic deformation of the elastic body 16 due to the input vibrational load causes the fluid to flow through the orifice 58 between the primary and auxiliary fluid chambers 60, 66, based on a pressure difference of the fluid between the two chambers 60, 66.

The flexible diaphragm 50 cooperates with the recess 44 of the second mounting member 14 to define a second working air chamber 68, which is located on one of the opposite sides of the flexible diaphragm 50 which is remote from the auxiliary fluid chamber 66. The second mounting member 14 has an air passage 69 formed therethrough in communication with the second working air chamber 66, and is provided with a second nipple 70 connected to the air passage 69.

With the thus constructed engine mount 10 installed in position on the motor vehicle, an air conduit 72 is connected to the first nipple 64 of the first mounting member 12, while an air conduit 78 is connected to the second nipple 70 of the second mounting member 14. The air conduit 72 is connected to a first switch valve 74, which has a first position for connection of the air conduit 72 to the ambient atmosphere, and a second position for connection of the air conduit 72 to a vacuum tank 76 which communicates with a suitable vacuum source available on the motor vehicle.

With the first switch valve 74 being switched alternately between the first and second positions, the first working air chamber 62 is exposed alternately to the atmosphere and a vacuum or reduced pressure through the nipple 64, air conduit 72 and first switch valve 74.

The air conduit 78 is connected to a second switch valve 82, which has a first position for connection of the 20 air conduit 78 to the ambient atmosphere, and a second position for connection of the air conduit 78 to a vacuum tank 82 which communicates with the vacuum source. With the second switch valve 80 being switched alternately between the first and second positions, the second working air chamber 68 is exposed alternately to the atmosphere and a vacuum or reduced pressure through the nipple 70, air conduit 78 and second switch valve 80. While the two vacuum tanks 76, 82 are connected to the first and second switch valves 74, 80, respectively, a single vacuum tank may be connected to the two switch valves 74, 80.

In the fluid-filled engine mount 10, the atmospheric pressure and the reduced air pressure are alternately applied to the first working air chamber 62 by switching operation of the first switch valve 74 at a suitable frequency, and to the second working air chamber 68 by switching operation of the second switch valve 80 at a suitable frequency. By operating the first and second switch valves 74, 80 alternately between their first and second positions at the suitable frequencies, the air pressures within the first and second working air chambers 62, 68 are periodically changed so as to oscillate the respective first and second movable members 30, 50.

When the reduced pressure is applied to the first working air chamber 62, the rubber member 32 of the first movable member 30 is elastically deformed or displaced toward the chamber 62 to an upper position as seen in FIG. 1, against an elastic force produced by the rubber member 32 due to the elastic deformation. When the reduced pressure is released from the first working air chamber 62, that is, when the atmospheric pressure is applied to the first working air chamber 62, the movable member 30 is restored or returned to its original or lower position of FIG. 1 by its own elasticity, that is, by the elastic force generated upon application of the reduced pressure to the chamber 62. As shown in FIG. 1, the movable member 30 and its rubber member 32 have a substantially flat shape when the movable member 30 is placed in its original position with the working air chamber 62 being exposed to the atmosphere. According to this arrangement, the first movable member 30 can be periodically reciprocated or oscillated in the vertical direction by the switching operation of the first switch valve 74, so that the fluid pressure in the primary fluid chamber 60 is periodically changed.

The flexible diaphragm 50 functioning as the second movable member has a smaller thickness and is more easily deformable or displaceable than the rubber member 32 of the first movable member 30. However, the flexible diaphragm 50 produces an elastic force upon elastic deformation or displacement, which elastic force is sufficient for the flexible diaphragm 50 to be returned from a lower position to its original position of FIG. 1 when the atmospheric pressure is applied to the second working air chamber 68 after the application of the reduced pressure. Like the first movable member 30, the second movable member 50 in the form of the flexible diaphragm 50 can be oscillated in the vertical direction by the switching operation of the second switch valve 80, so that the fluid pressure in the auxiliary fluid chamber 66 is periodically changed.

The oscillation of the flexible diaphragm 50 at a frequency corresponding to the frequency of the input vibration causes a periodic change in the auxiliary fluid chamber 66, inducing a relatively large difference between the fluid pressures within the primary and auxiliary fluid chambers 60, 66, thereby assuring a sufficient amount of flow of the fluid through the orifice 58, so that the present engine mount 10 is capable of exhibiting a high vibration damping effect based on the resonance of the fluid flowing through the orifice 58.

Further, the fluid pressure difference between the primary and auxiliary fluid chamber 60, 66 can be further increased by positively inducing a periodic fluid pressure change in the primary fluid chamber 60 by oscillating the first movable member 30 at the frequency corresponding to the frequency of the input vibration, while at the same time oscillating the second movable member 50 so as to induce a periodic fluid pressure change in the auxiliary fluid chamber 66. As a result, the amount of the fluid flow through the orifice 58 can be further effectively increased, and the vibration damping effect based on the fluid flows through the orifice 58 can be further improved. For maximizing the amount of flow of the fluid through the orifice 58, it is desirable to control the first and second switch valve 74, 80 such that the periodic changes of the fluid pressures within the primary and auxiliary fluid chambers 60, 66 have a phase difference of about 180 degrees.

The length and cross sectional area of the orifice 58 are determined so as to effectively damp the input vibrations within a desired frequency band, on the basis of the fluid flows through the orifice 58, depending upon the stiffness values of the rubber member 32 and the flexible diaphragm 50 which partially define the primary and auxiliary fluid chambers 60, 66. For instance, the orifice 58 is tuned to enable the engine mount 10 effectively isolate engine idling vibrations, on the basis of the fluid flows through the orifice 58.

The damping effect based on the fluid flows through the orifice 58 is lowered with respect to the vibrations whose frequencies are outside the frequency band to which the orifice 58 is tuned. However, the engine mount 10 can exhibits a high damping effect with respect to those vibrations, by oscillating the first and second movable members 30, 50 with a suitable phase difference. Therefore, the present engine mount 10 is capable of exhibiting an excellent vibration damping effect over a wide range of frequency of the input vibrations.

When the frequency of the input vibration is higher than the frequency band to which the orifice 58 is tuned, a resistance to flow of the fluid through the orifice 58 tends to be increased, making it difficult for the engine mount 10 to exhibit a satisfactory damping effect based on the fluid flows through the orifice 58, with respect to the high-frequency vibration. In this case, the first movable member 30 is oscillated at a frequency corresponding to the frequency of the input vibration, so as to reduce or absorb a rise of the fluid pressure in the primary fluid chamber 60, for preventing or minimizing an excessive increase in the dynamic spring constant of the engine mount 10, whereby the engine mount 10 can exhibit a high damping effect with respect to the high-frequency vibration.

When the frequency of the input vibration is lower than the frequency band to which the orifice 58 is tuned, the first and second movable members 30, 50 are both oscillated in substantially the same phase, so as to induce the periodic fluid pressure changes in the primary and auxiliary fluid chambers 60, 66, which are substantially in phase with the periodic fluid pressure change caused in the primary fluid chamber 60 due to the oscillatory elastic deformation of the elastic body 16 by the low-frequency vibration. This manner of oscillation of the two movable members 30, 50 permits the engine mount 10 to effectively damp the low-frequency vibration.

The first and second switch valves 74, 80 may be controlled to oscillate the first and second movable members 30, 50, in a known adaptive control fashion such as a feedback fashion or according to a stored data map, on the basis of an output signal of a vibration sensor such as an acceleration sensor, so as to provide the desired vibration damping characteristics. The control parameters may include at least one of the frequencies, phase difference and amplitudes of the oscillation of the two movable members 30, 50.

The present engine mount 10 does not require an actuator such as electromagnetic drive means for oscillating the movable members 30, 50, and is accordingly simple and compact in construction with reduced weight and comparatively easy and economical to manufacture. The simple construction results in improved operating reliability and durability and comparatively easy maintenance or repair of the engine mount 10.

In other words, the present engine mount 10 is simple and compact in construction with reduced size and weight, but is capable of providing an excellent damping effect with various kinds of input vibrations, owing to the active control of the fluid pressures in the primary and auxiliary fluid chambers 60, 66.

Further, the fluid pressures in the primary and auxiliary fluid chambers 60, 66 can be controlled by utilizing the reduced pressure, which is available on any motor vehicle having an internal combustion engine, that is, by utilizing the reduced pressure in the intake system of the engine. Thus, the instant engine mount 10 does not require an exclusive energy source for oscillating the movable members 30, 50.

In addition, the present engine mount 10 does not suffer from heat generation and extremely large electric power consumption due to energization of electromagnetic drive means, even when the movable members 30, 50 are oscillated continuously for a long time.

Where the engine mount 10 is used in an environment in which compressed air is readily available, a positive pressure may be used in place of the reduced pressure, for oscillating the movable members 30, 50. While the illustrated first embodiment of FIG. 1 is adapted to alternately apply the reduced and atmospheric pressures to the working air chambers 62, 68, the reduced or positive pressure may be periodically changed between two different reduced or positive values.

It is also noted that the elasticity of the rubber member 32 of the first movable member 30 contributes to stable returning of the movable member 30 to the original position upon releasing of the reduced pressure from the first working air chamber 62, so that the movable member 30 maintains the initial characteristics for a long time. It is desirable to interpose suitable biasing means such as a coil spring between the rubber member 32 and the upper metal member 18, so that the biasing force of this biasing means acts on the movable member 30 in the direction opposite to the direction of elastic deformation or displacement of the movable member 30 by the reduced pressure applied thereto.

Figure 2:
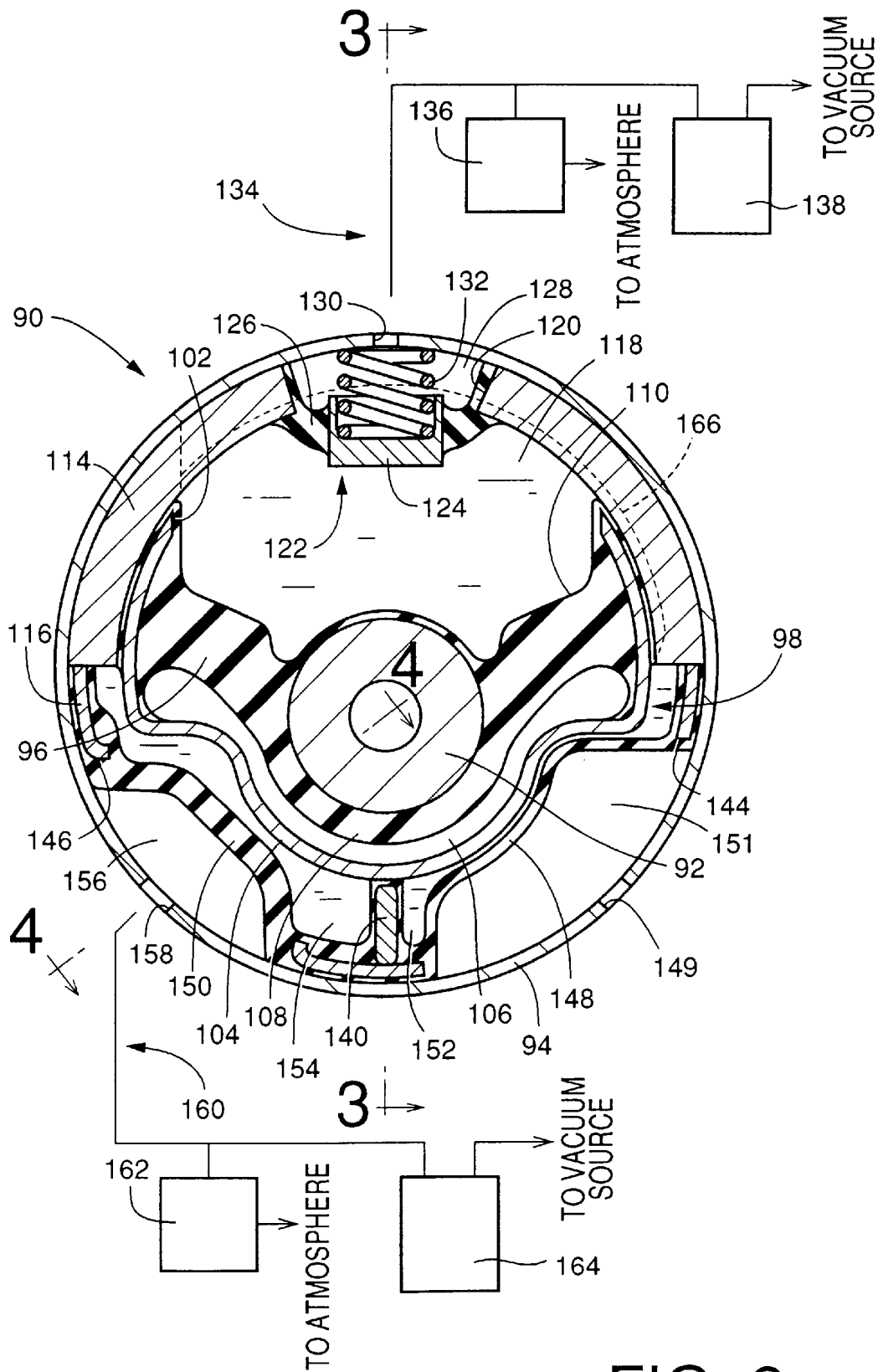
FIG. 2 is a transverse cross sectional view of an engine mount of cylindrical bushing type constructed according to a second embodiment of the invention.
Figure 3:
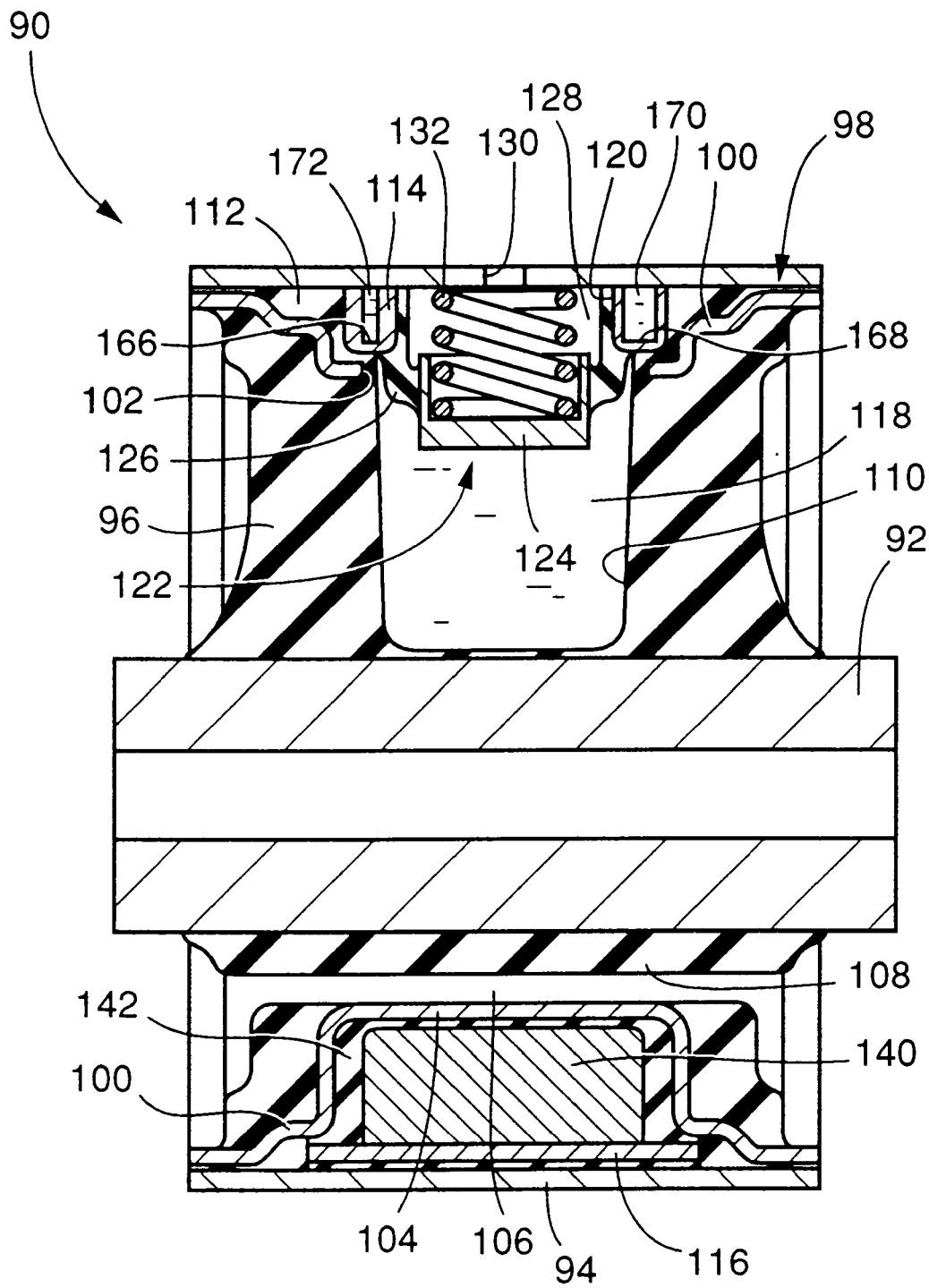
Figure 4:
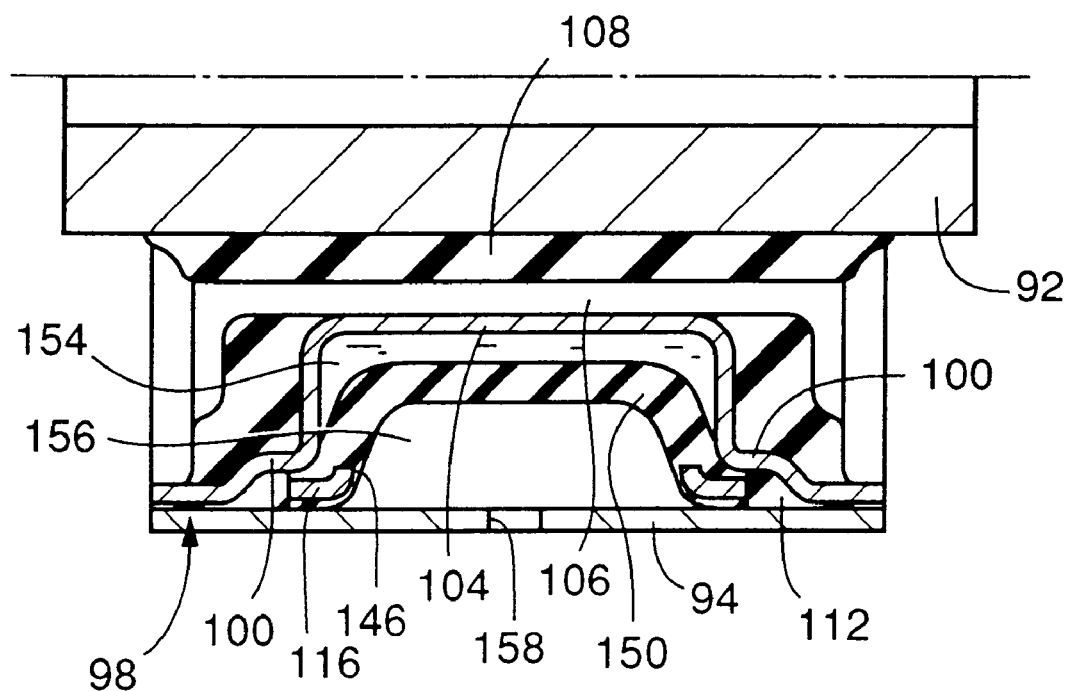
FIG. 4 is a cross sectional view taken along line 4—4 of FIG. 2.

Referring next to FIGS. 2–4, there will be described a cylindrical engine mount 90 constructed according to a second embodiment of this invention.

The engine mount 90 includes a first mounting member in the form of an inner sleeve 92, and a second mounting member in the form of an outer sleeve 94. These inner and outer sleeves 92, 94 are made of metallic materials, and are spaced apart from each other by a predetermined distance in the radial direction. The two sleeves 92, 94 are elastically connected to each other by an elastic body 96 interposed therebetween. The inner and outer sleeves 92, 94 are fixed to one and the other of the power unit and body of a motor vehicle, so that the power unit is mounted on the vehicle body in a vibration damping manner. Before installation of the engine mount 90 on the vehicle, the inner and outer sleeves 92, 94 are disposed eccentrically with respect to each other with a given radial offset distance. With the engine mount 90 installed on the vehicle, the elastic body 96 is elastically compressed with the weight of the power unit acting thereon, and the inner and outer sleeves 92, 94 are brought into a substantially concentric or coaxial relationship with each other. The engine mount 90 is positioned such that the direction of offset of the inner and outer sleeves 92, 94 prior to the installation of the vehicle coincides with the vertical direction, so that the engine mount 90 is capable of effectively damping the vibrations applied thereto in the vertical direction (as seen in FIG. 2) and a direction almost parallel to the vertical direction.

Described in detail, the inner sleeve 92 is a cylindrical member having a relatively large wall thickness and a relatively small diameter. A metallic intermediate sleeve 98 is disposed radially outwardly of the inner sleeve 92 such that the intermediate sleeve 98 is radially offset by a given amount with respect to the inner sleeve 92. This intermediate sleeve 98 is a cylindrical member having a relatively small wall thickness and a relatively large diameter. The intermediate sleeve 98 has two stepped or shoulder portions 100 with a smaller diameter near the opposite axial ends, as shown in FIGS. 3 and 4. The shoulder portions 100 are formed over the entire circumference of the intermediate sleeve 98. The intermediate sleeve 98 has a window 102 in an upper one of two circumferential parts thereof which are diametrically opposed to each other in the direction of offset with respect to the inner sleeve 92. An axially intermediate portion of the intermediate sleeve 98 has a recessed portion 104 in the other or lower circumferential part which is nearer to the axis of the inner sleeve 92 in the offset direction, than the upper circumferential part having the window 102. The recess of the recessed portion 104 is open in the radially outward direction.

The elastic body 96 is interposed between the inner sleeve 92 and the intermediate sleeve 98 such that the inner and intermediate sleeves 92, 98 are bonded at their respective outer and inner circumferential surfaces to the elastic body 96, in the process of vulcanization of a rubber material to form the elastic body 96. An axial void 106 is left between the inner and intermediate sleeves 92, 98, so as to extend over the entire axial length of the engine mount 90. This axial void 106 is located in a circumferential portion of the engine mount 90 corresponding to the recessed portion 104 of the intermediate sleeve 98, and has a circumferential dimension almost equal to a half of the entire circumference of the intermediate sleeve 98. In the presence of the axial void 106, the elastic body 96 between the inner and intermediate sleeves 92, 98 is almost entirely disposed on only the upper side of the inner sleeve 92, namely, on only one of the vertically opposite sides of the inner sleeve 92 on which the radial offset distance to the intermediate sleeve 98 is larger than on the other side. This arrangement is effective to reduce a tensile stress acting on the elastic body 96 due to the weight of the power unit. A rubber buffer 108 is provided to cover a portion of the outer circumferential surface of the inner sleeve 92 on the side of the axial void 106. Upon application of an excessive vibrational load to the engine mount 90, the inner sleeve 92 may abut on the recessed portion 104 of the intermediate sleeve 98 through the rubber buffer 108, so as to prevent an excessive amount of tensile deformation of the elastic body 96.

The elastic body 96 has a pocket 110 aligned with the window 102 of the intermediate sleeve 98. That is, the pocket 110 is formed in a circumferential portion of the elastic body 96 at which the vertical offset distance between the inner and intermediate sleeves 92, 98 is the largest. The pocket 110 is open in the outer circumferential surface of the intermediate sleeve 98 through the window 102. On the outer circumferential surface of the intermediate sleeve 98, a sealing rubber layer 112 having a relatively small thickness is formed integrally with the elastic body 96, as shown in FIGS. 3 and 4.

The inner and intermediate sleeves 92, 98 and the elastic body 96 constitute an intermediate product, which is prepared by vulcanizing a rubber material to form the elastic body 96, within a mold in which the inner and intermediate sleeves 92, 98 are positioned relative to each other. On this intermediate product, there are fitted an orifice member 114 and a retainer member 116, on which is finally fitted the outer sleeve 94 to produce the present engine mount 90. The orifice member 114 and the retainer member 116 are both substantially semi-cylindrical members, which cooperate to constitute a cylindrical structure fitted on an axially intermediate portion of the outer circumferential surface of the intermediate sleeve 98. The outer sleeve 94, which is a cylindrical member having a relatively large diameter, is then fitted on the intermediate sleeve 98 so as to cover the outer circumferential surface of the cylindrical structure consisting of the orifice and retainer members 114, 116.

The substantially semi-cylindrical orifice member 114 has a relatively large wall thickness, and is fitted on an upper portion of the outer circumferential surface of the intermediate sleeve 98, at which the radial offset distance to the inner sleeve 92 is relatively large. The orifice member 114 is fitted on the intermediate sleeve 98 such that the opposite axial end portions and the opposite circumferential end portions of the orifice member 114 are held in contact with the respective four portions of the intermediate sleeve 98 which define the rectangular window 102, so that the window 102 aligned with the pocket 110 of the elastic body 96 is fluid-tightly closed by the orifice member 114, whereby a primary fluid chamber 118 is defined by the inner sleeve 92, the elastic body 96 (pocket 110) and the orifice member 114. The primary fluid chamber 118 is filled with a non-compressible fluid such as water, aklylene glycol, polyalkylene glycol or silicone oil. The pressure of the fluid in the primary fluid chamber 118 is periodically changed due to oscillatory elastic deformation of the elastic body 96 upon application of a vibrational load between the inner and outer sleeves 92, 94.

The orifice member 114 has a through-hole 120 formed therethrough in a circumferentially and axially central portion thereof which partially defines the primary fluid chamber 118. This through-hole 120 is fluid-tightly closed by a first movable member 122 such that the first movable member 122 is bonded at its periphery to the edge of the through-hole 120, and partially defines the primary fluid chamber 118. The first movable member 122 consists of a circular metal disk 124, and an annular rubber member 126 which has a relatively large thickness and which is bonded to the outer circumferential surface of the metal disk 124 in the process of vulcanization of a rubber material for the rubber member 126. The rubber member 126 produces an elastic force for restoring the first movable member 122 to its original position and shape after the rubber member 126 is elastically deformed as described below. The first movable member 122 cooperates with the outer sleeve 94 to define a fluid-tight first working air chamber 128. The outer sleeve 94 has an inlet 130 formed therethrough in communication with the first working air chamber 128.

The first working air chamber 128 accommodates a coil spring 132 interposed between the outer sleeve 94 and the metal disk 134 of the first movable member 122. The coil spring 132 biases the rubber member 126 in the radially inward direction of the outer sleeve 94, namely, so as to force the metal disk 124 toward the primary fluid chamber 118. The biasing force of the coil spring 132 is added to the elastic force of the rubber member 126 when the first movable member 122 is returned or restored to the original position and shape, so that the rubber member 126 can maintain its initial elasticity for a long time.

When the engine mount 90 is installed on the vehicle, an air conduit 134 is connected to the inlet 130, which in turn is connected to a first switch valve 136 which is adapted to connect the first working air chamber 128 selectively to the atmosphere and a vacuum tank 138 through the air conduit 134 and the inlet 130. The vacuum tank 138 is connected to a suitable vacuum source. Thus, like the first working air chamber 62 in the first embodiment of FIG. 1, the first working air chamber 128 can be alternately exposed to the atmospheric pressure and the reduced pressure in the vacuum tank 138, by switching operation of the first switch valve 136, so that the air pressure in the first working air chamber 128 can be periodically changed, so as to oscillate the first movable member 122 between the radially inner original position on the side of the primary fluid chamber 118 and a radially outer position on the side of the first working air chamber 128.

On the other hand, the substantially semi-cylindrical retainer member 116 has a relatively small wall thickness, and is fitted on a lower portion of the outer circumferential surface of the intermediate sleeve 98, at which the radial offset distance to the inner sleeve 92 is relatively small. The retainer member 116 is fitted on the intermediate sleeve 98 such that the opposite axial end portions of the retainer member 116 are supported by the shoulder portion 100 of the intermediate sleeve 98, so that the recessed portion 104 is closed by the retainer member 116. The retainer member 116 has a partition wall 140 fixed to a circumferentially intermediate portion thereof so as to extend in the radially inward direction, through the recessed portion 104 of the intermediate sleeve 98, as shown in FIG. 2. The free end of the partition wall 140 is held in close contact with the surface of the recessed portion 104, so that the partition wall 140 fluid-tightly divides the recess of the recessed portion 104 into two fluid tight sections on the opposite sides thereof. These two sections of the recess are arranged in the circumferential direction of the intermediate sleeve 98. To secure fluid tightness of those two sections of the recess, the end face of the partition wall 140 in contact with the recess portion 104 is covered with a sealing rubber member 142.

The retainer member 116 has a first opening 144 and a second opening 146 formed in respective two circumferential portions thereof on the circumferentially opposite sides of the partition wall 140. These first and second openings 144, 146 are fluid-tightly closed by a flexible diaphragm 148 and a second movable member 150, respectively.

The flexible diaphragm 148 has a relatively small thickness and is easily deformable or displaceable. The flexible diaphragm 148 is bonded by vulcanization to the edge of the first opening 144 and is accommodated in one of the above-indicated two sections of the recess of the recessed portion 104 on one of the opposite sides of the partition wall 140, such that the flexible diaphragm 148 is curved radially inwardly of the outer sleeve 94, as shown in FIG. 2. The flexible diaphragm 148 cooperates with the intermediate sleeve 98 to define a fluid-tightly enclosed equilibrium fluid chamber 152 filled with the same non-compressible fluid as the fluid filling the primary fluid chamber 118. The flexible diaphragm 148 also cooperates with the outer sleeve 94 to define an atmospheric pressure chamber 151 which communicates with the atmosphere through an air vent 149 and which facilitates deformation or displacement of the flexible diaphragm 148.

The second movable member 150 is a rubber member which has a larger thickness than the flexible diaphragm 148 and which produces an elastic force for restoring the movable member 150 to its radially inner original position. The second movable member 150 is bonded by vulcanization to the edge of the second opening 146 of the retainer member 116, so as to fluid-tightly close the second opening 146. The second movable member 150 is accommodated in the other of the above-indicated two sections of the recess of the recessed portion 104 on the other side of the partition wall 140, such that the second movable member 150 cooperates with the above-indicated other section of the recess to define an auxiliary fluid chamber 154 filled with the same fluid as the fluid filling the primary fluid chamber 118.

The second movable member 150 also cooperates with the outer sleeve 94 to define a second working air chamber 156, which is provided on the side of the movable member 150 remote from the auxiliary fluid chamber 154. The outer sleeve 94 has an inlet 158 communicating with the second working air chamber 156. When the engine mount 90 is installed on the vehicle, an air conduit 160 is connected to the inlet 158, which in turn is connected to a second switch valve 162 which is adapted to connect the second working air chamber 156 selectively to the atmosphere and a vacuum tank 164 through the air conduit 160 and the inlet 158. The vacuum tank 164 is connected to the vacuum source. Thus, like the second working air chamber 68 in the first embodiment of FIG. 1, the second working air chamber 156 can be alternately exposed to the atmospheric pressure and the reduced pressure in the vacuum tank 164, by switching operation of the second switch valve 162, so that the air pressure in the second working air chamber 156 can be periodically changed, so as to oscillate the second movable member 150 between the radially inner original position on the side of the auxiliary fluid chamber 154 and a radially outer position on the side of the second working air chamber 156.

The orifice member 114 has a first groove 166 and a second groove 168 in the outer circumferential surface. These grooves 166, 168, which have suitable lengths, are closed by the outer sleeve 94 to define a communication passage 170 for fluid communication between the primary fluid chamber 118 and the equilibrium fluid chamber 152, and an orifice 172 for fluid communication between the primary and auxiliary fluid chambers 118, 154. The communication passage 170 and the orifice 172 are independent of each other, and permit the fluid to flow between the primary and equilibrium fluid chambers 118, 152 and between the primary and auxiliary fluid chambers 118, 154, upon application of the vibrations to the engine mount 90, so that the vibrations can be damped based on the resonance of the fluid flowing through the passage 170 and orifice 172.

In the present second embodiment, the communication passage 170 has a smaller ratio A/L than the orifice 172, where "A" represents the cross sectional area of fluid flow of the passage and orifice 170, 172, while "L" represents the length of the passage and orifice 170, 172. In this arrangement, the engine mount 90 exhibits a damping effect with respect to a vibrational load having a relatively low frequency, based on the resonance of the fluid flow through the communication passage 170, and a damping effect with respect to a vibrational load having a relatively high frequency, based on the resonance of the fluid flow through the orifice 172. In other words, the passage and orifice 170, 172 are tuned to relatively low and high frequencies of the input vibrations. While the passage 170 has a larger resistance to the fluid flows therethrough, than the orifice 172, there arises a sufficiently large amount of flow of the fluid through the passage 170 upon application of the low-frequency vibrations, since the spring stiffness of the second movable member 150 partially defining the auxiliary fluid chamber 154 is made higher than that of the flexible diaphragm 148 partially defining the equilibrium fluid chamber 152. The amount of flow of the fluid through the passage 170 upon application of the low-frequency vibrations can be increased by applying a predetermined reduced pressure to the second working air chamber 156 so as to prevent the displacement of the second movable member 150 and the flow of the fluid through the orifice 172, for thereby improving the damping effect based on the fluid flows through the passage 170.

Like the engine mount 10 of the first embodiment, the present engine mount 90 constructed as described above is adapted such that the first and second movable members 122, 150 are oscillated at frequencies corresponding to the frequency of the input vibration, so as to induce a sufficiently large difference between the fluid pressures in the primary and auxiliary fluid chambers 118, 154, for providing an improved vibration damping effects based on the fluid flows through the orifice 172.

Further, the input vibrations whose frequencies are outside the frequency band to which the orifice 172 is tuned can be effectively damped by oscillating the first and second movable members 122, 150 to control the fluid pressures in the primary and auxiliary fluid chambers 118, 154, with a suitable difference of oscillation phases of the two movable members 122, 150.

In addition, the low-frequency vibrations which are less likely to be effectively damped based on the fluid flows through the orifice 172 can be effectively damped based on the resonance of the fluid flows through the communication passage 170, so that the present engine mount 90 exhibits excellent damping effects over a wide range of frequency of the input vibrations. Moreover, the oscillation of the first movable member 122 at a frequency corresponding to the frequency of the input vibration makes it possible to control the fluid pressure difference between the primary and equilibrium fluid chambers 118, 152, for increasing the amount of fluid flows through the communication passage 170, to thereby further improve the damping effect based on the fluid flows through the passage 170.

The engine mount 90 does not require an actuator such as electromagnetic drive means, and is accordingly simple and compact in construction with reduced weight and comparatively easy and economical to manufacture. Thus, the engine mount 90 has substantially the same advantage as the engine mount 10, as described above.

In the engine mount 90, too, the reduced pressure used together with the atmospheric pressure for oscillating the movable members 122, 150 may be replaced by a positive pressure. Further, the reduced and atmospheric pressures may be replaced by two different values of a positive or negative pressure.

The coil spring 132 disposed in the first working air chamber 128 is not essential, and may be eliminated. In the absence of the coil spring 132, the movable member 122 is returned to the original position by only the elastic force produced by the rubber member 126.

While the equilibrium chamber 152 and the communication passage 170 are provided to provide the engine mount 90 with the desired damping characteristics in the second embodiment, the provision of these chamber and passage 152, 170 is not essential.

While the presently preferred embodiments of the invention have been described above in detail for illustrative purpose only, it is to be understood that the invention is not limited to the details of the illustrated embodiment, but may be otherwise embodied.

In the illustrated embodiments, only one first working air chamber is provided for controlling the fluid pressure in the primary fluid chamber through the first movable member. However, a plurality of first working air chambers may be provided for oscillating respective first movable members with periodic air pressure changes being induced in the air chambers as described. In this case, the required amount of air flow into and from each first working air chamber can be reduced, and the required amount of displacement of each first movable member can be accordingly reduced, while assuring a sufficient amount of fluid pressure change in the primary fluid chamber. The reduced required amount of displacement of each first movable member permits an improved control response of the fluid pressure in the primary fluid chamber and an accordingly improved operating response of the engine mount.

Similarly, a plurality of second working air chambers may be provided for oscillating respective second movable members to control the fluid pressures in respective auxiliary fluid chambers, depending upon the desired damping characteristics of the engine mount. The auxiliary fluid chambers communicate with the primary fluid chamber through respective orifices, which are tuned to different frequency bands of the input vibrations. By suitably controlling the air pressures in the individual second working air chambers, the input vibrations in the different frequency bands can be effectively damped based on the fluid flows through the differently tuned orifices, respectively. Thus, the engine mount is enabled to damp the input vibrations over a wide frequency range. For instance, the air pressure in one of the second working air chambers is periodically changed at a frequency corresponding to the frequency of the input vibration, so as to induce the fluid flows through the corresponding orifice between the corresponding auxiliary fluid chamber and the primary fluid chamber, while the air pressure in each of the other second working air chamber or chambers is held constant, so as to inhibit the fluid flows through the other orifice or orifices. Thus, the selected one of the orifices is enabled to operate to provide a damping effect with respect to the selected frequency band of the input vibrations.

Further, a plurality of equilibrium fluid chambers may be provided in fluid communication with the primary fluid chamber through respective communication passages, which are tuned to effectively damp different frequency bands of the input vibrations, respectively.

Although the fluid-filled vibration damping devices in the form of engine mounts for motor vehicles have been described above by way of example, only, it will be understood that the principle of this invention is equally applicable to other fluid-filled vibration damping devices for motor vehicles, such as body mounts, differential mounts and suspension bushings, and also to various dampers not used for the motor vehicles.

It is to be understood that the present invention may be made with various other changes, modifications and improvements, which may occur to those skilled in the art, without departing from the spirit and scope of the invention defining in the following claims:

What is claimed is:

1. A fluid-filled vibration damping device comprising:
   a first and a second mounting member which are spaced apart from each other;
   an elastic body elastically connecting said first and second mounting members and partially defining a primary fluid chamber filled with a non-compressible fluid, said elastic body being elastically deformed so as to cause a change in a pressure of said fluid in said primary fluid chamber, upon application of a vibrational load between said first and second mounting members;
   a first movable member partially defining said primary fluid chamber and movable relative to said first and second mounting members, said first movable member partially defining a first working air chamber on one of opposite sides thereof which is remote from said primary fluid chamber, said first movable member being oscillated by a periodic change of an air pressure in said first working air chamber;
   a second movable member partially defining, on one of opposite sides thereof, an auxiliary fluid chamber filled with said non-compressible fluid, and on the other of said opposite sides, a second working air chamber independent of said first working air chamber, said second movable member being oscillated by a periodic change of an air pressure in said second working air chamber;
   means for defining an orifice for fluid communication between said primary and auxiliary fluid chambers;
   a first switch valve connected to said first working air chamber and connecting said first working air chamber alternately to external air pressure sources having respective pressure values different from each other for thereby causing said periodic change of said air pressure in said first working air chamber, and
   a second switch valve connected to said second working air chamber and connecting said second working air chamber alternately to said external air pressure sources, for thereby causing said periodic change of said air pressure in said second working air chamber independently of said periodic change of said air pressure in said first working air chamber.

2. A fluid-filled vibration damping device according to claim 1, wherein each of at least one of said first and second movable members includes a rubber member which produces an elastic force for restoring said each movable member to an original position thereof during oscillation thereof.

3. A fluid-filled vibration damping device according to claim 1, further comprising biasing means for biasing each of at least one of said first and second movable members in a predetermined direction.

4. A fluid-filled vibration damping device according to claim 1, further comprising:
   at least one flexible diaphragm each of which partially defines an equilibrium fluid chamber filled with said non-compressible fluid, such that said each flexible diaphragm permits a change in a volume of said equilibrium fluid chamber; and
   means for defining a communication passage for fluid communication between said primary fluid chamber and said equilibrium fluid chamber.

5. A fluid-filled vibration damping device according to claim 4, wherein said communication passage for fluid communication between said primary and equilibrium fluid chambers and said orifice for fluid communication between said primary and auxiliary fluid chambers are tuned such that a frequency of the vibrational load which is effectively damped by flows of the fluid through said communication passage is lower than that of the vibrational load which is effectively damped by flows of the fluid through said orifice.

6. A fluid-filled vibration damping device according to claim 1, wherein said first mounting member consists of an inner sleeve, while said second mounting member consists of an outer sleeve disposed radially outwardly of said inner sleeve, said elastic body being interposed between said inner and outer sleeves and having a pocket which is open in an outer circumferential surface thereof and closed by said outer sleeve so as to form said primary fluid chamber, said first movable member being disposed within said pocket and cooperating with said outer sleeve to define said first working air chamber.

7. A fluid-filled vibration damping device according to claim 6, further comprising an intermediate sleeve which is fitted on an outer circumferential surface of said elastic body and which has a window formed therethrough, said pocket being open in an outer circumferential surface of said intermediate sleeve through said window, said outer sleeve being fitted on said outer circumferential surface of said intermediate sleeve so as to close said window and cooperating with said pocket to define said primary fluid chamber, said intermediate sleeve having a recessed portion open in said outer circumferential surface thereof, said second movable member cooperating said said outer sleeve to define said second working air chamber on said one of said opposite sides thereof, and cooperating with said recessed portion to define said auxiliary fluid chamber on the other of said opposite sides.

8. A fluid-filled vibration damping device according to claim 1, wherein at least one of said external air pressure sources is a vacuum pressure source.

9. A fluid-filled vibration damping device according to claim 1, wherein said first switch valve and said second switch valve are controlled such that said periodic change of said air pressure in said first working air chamber and said periodic change of said air pressure in said second working air chamber have a predetermined controlled phase difference with respect to each other.

10. A fluid-filled vibration damping device according to claim 1, wherein said first switch valve and said second switch valve are controlled such that said air pressure in said first working air chamber and said air pressure in said second working air chamber are changed in synchronization with a frequency of said vibrational load to be damped by the vibration damping device.

11. A method of damping vibrations with a fluid-filled vibration damping device comprising a first and a second mounting member which are spaced apart from each other; an elastic body elastically connecting said first and second mounting members and partially defining a primary fluid chamber filled with a non-compressible fluid, said elastic body being elastically deformed so as to cause a change in a pressure of said fluid in said primary fluid chamber, upon application of a vibrational load between said first and second mounting members; a first movable member partially defining said primary fluid chamber and movable relative to said first and second mounting members, said first movable member partially defining a first working air chamber on one of opposite sides thereof which is remote from said primary fluid chamber, said first movable member being oscillated by a periodic change of an air pressure in said first working air chamber; a second movable member partially defining, on one of opposite sides thereof, an auxiliary fluid chamber filled with said non-compressible fluid, and on the other of said opposite sides, a second working air chamber independent of said first working air chamber, said second movable member being oscillated by a periodic change of an air pressure in said second working air chamber; means for defining an orifice for fluid communication between said primary and auxiliary fluid chambers; a first switch valve connected to said first working air chamber and connecting said first working air chamber alternately to external air pressure sources having respective pressure values different from each other for thereby causing said periodic change of said air pressure in said first working air chamber; a second switch valve connected to said second working air chamber and connecting said second working air chamber alternately to said external air pressure sources, for thereby causing said periodic change of said air pressure in said second working air chamber independently of said periodic change of said air pressure in said first working air chamber, said method comprising:

controlling said first switch valve and said second switch valve such that said periodic change of said air pressure in said first working air chamber and said periodic change of said air pressure in said second working air chamber have a predetermined phase difference with respect to each other.

12. A method according to claim 11, wherein said first switch valve and said second switch valve are controlled such that said air pressure in said first working air chamber and said air pressure in said second working air chamber are changed in synchronization with a frequency of said vibrational load to be damped by the vibration damping device.

13. A method according to claim 11, wherein said predetermined phase difference is substantially 180 degrees.

14. A method according to claim 11, wherein said predetermined phase differences is substantially 0 degree.

15. A method according to claim 11, wherein at least one of said external air pressure sources generates a vacuum pressure.

* * * * *